A. H. BIERTUEMPFEL.
MACHINE FOR SPLITTING CORK BARK.
APPLICATION FILED AUG. 4, 1911.
1,038,272.
Patented Sept. 10, 1912.
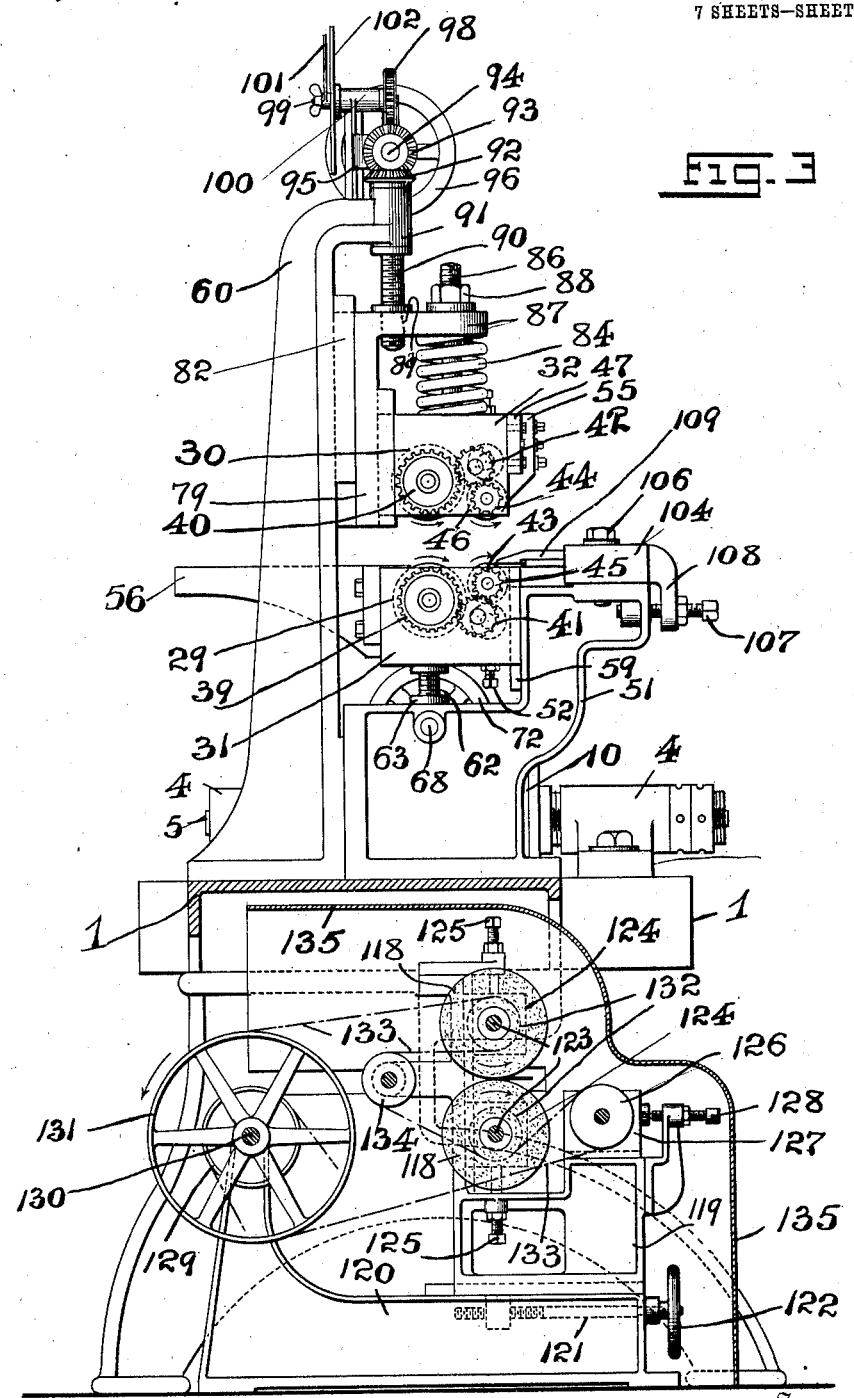

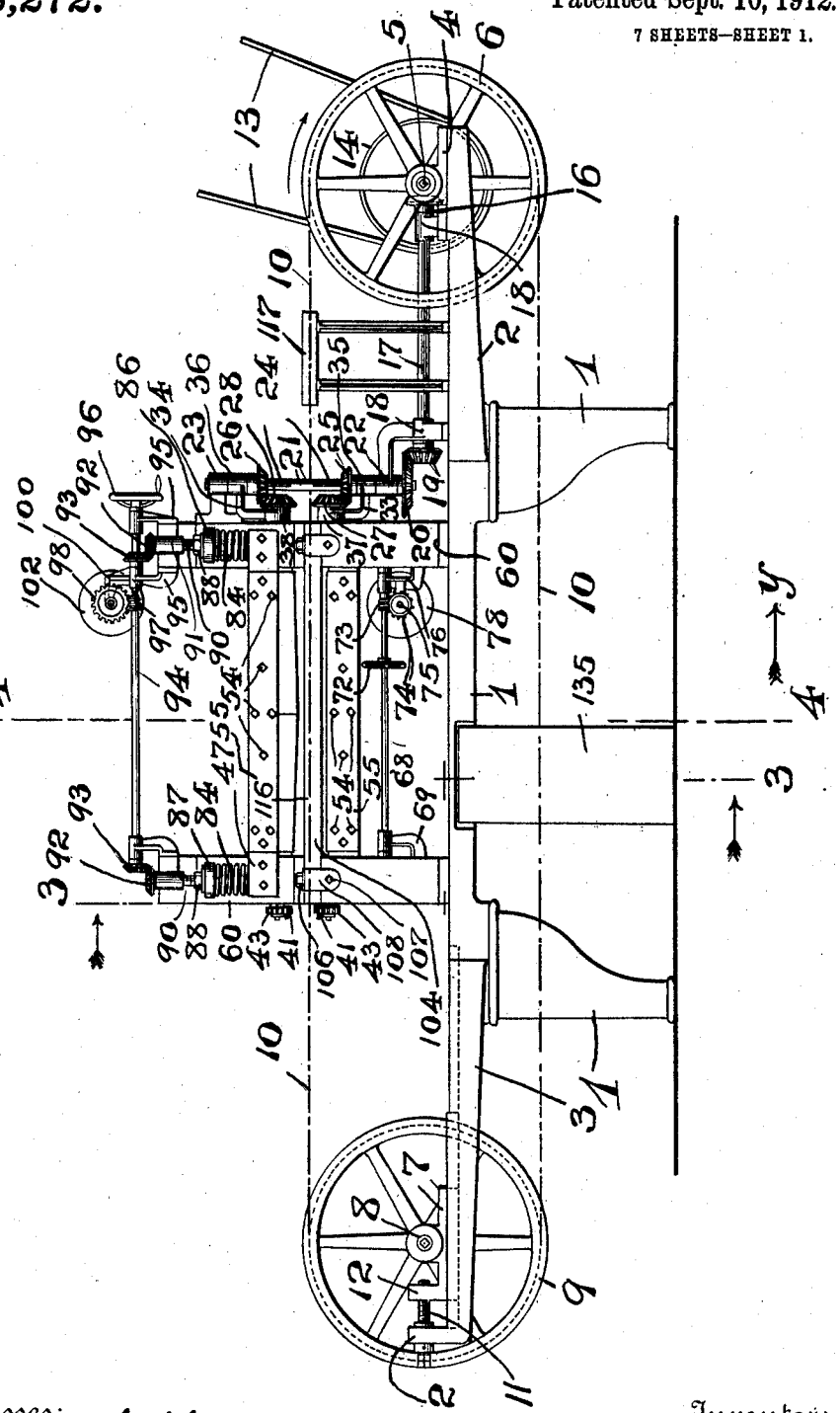

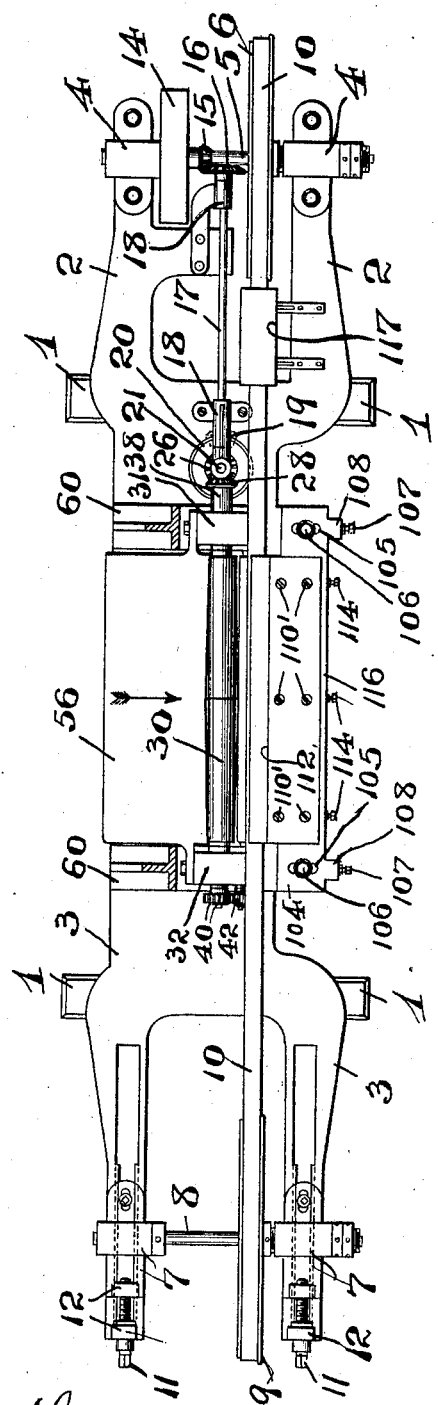

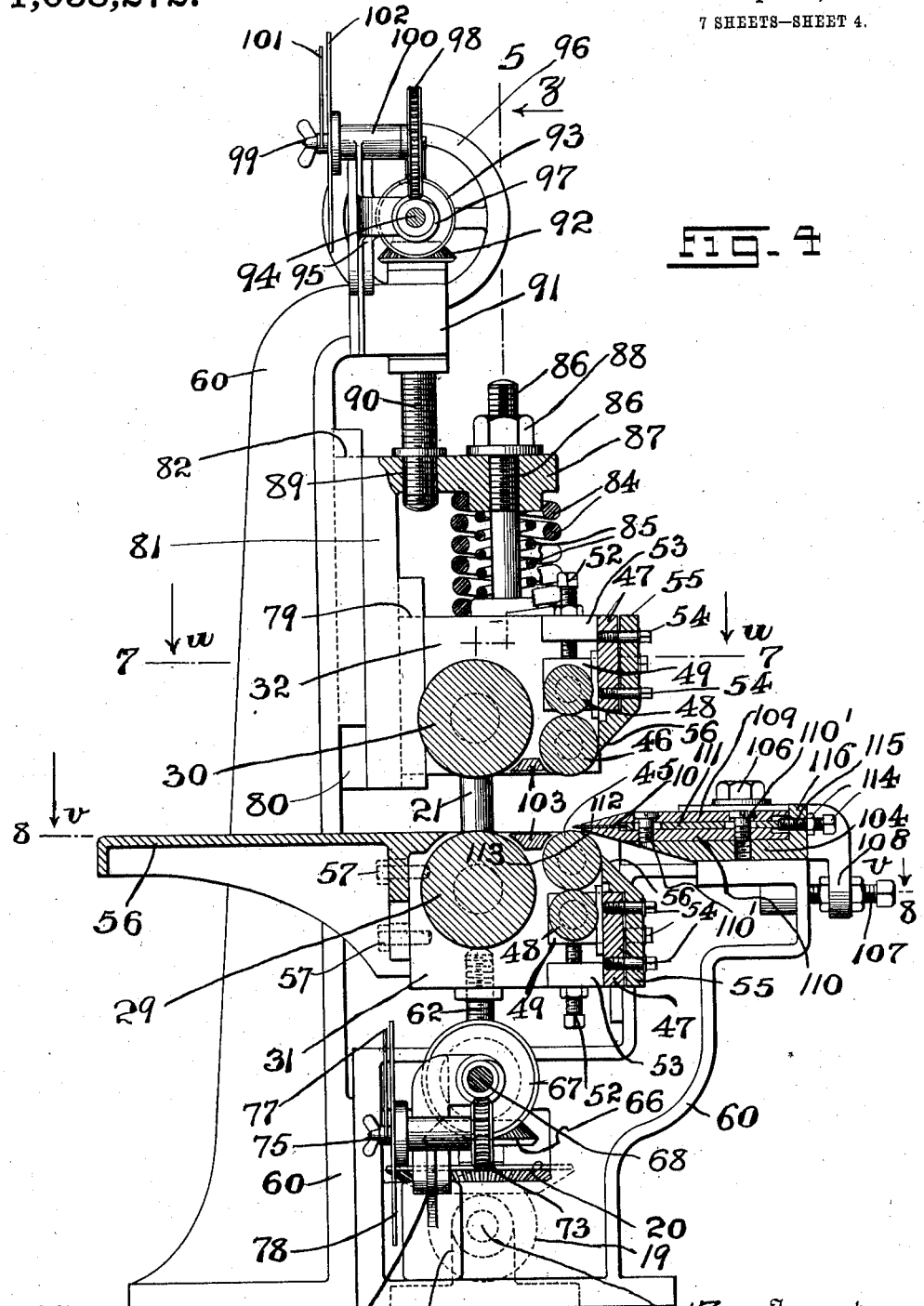

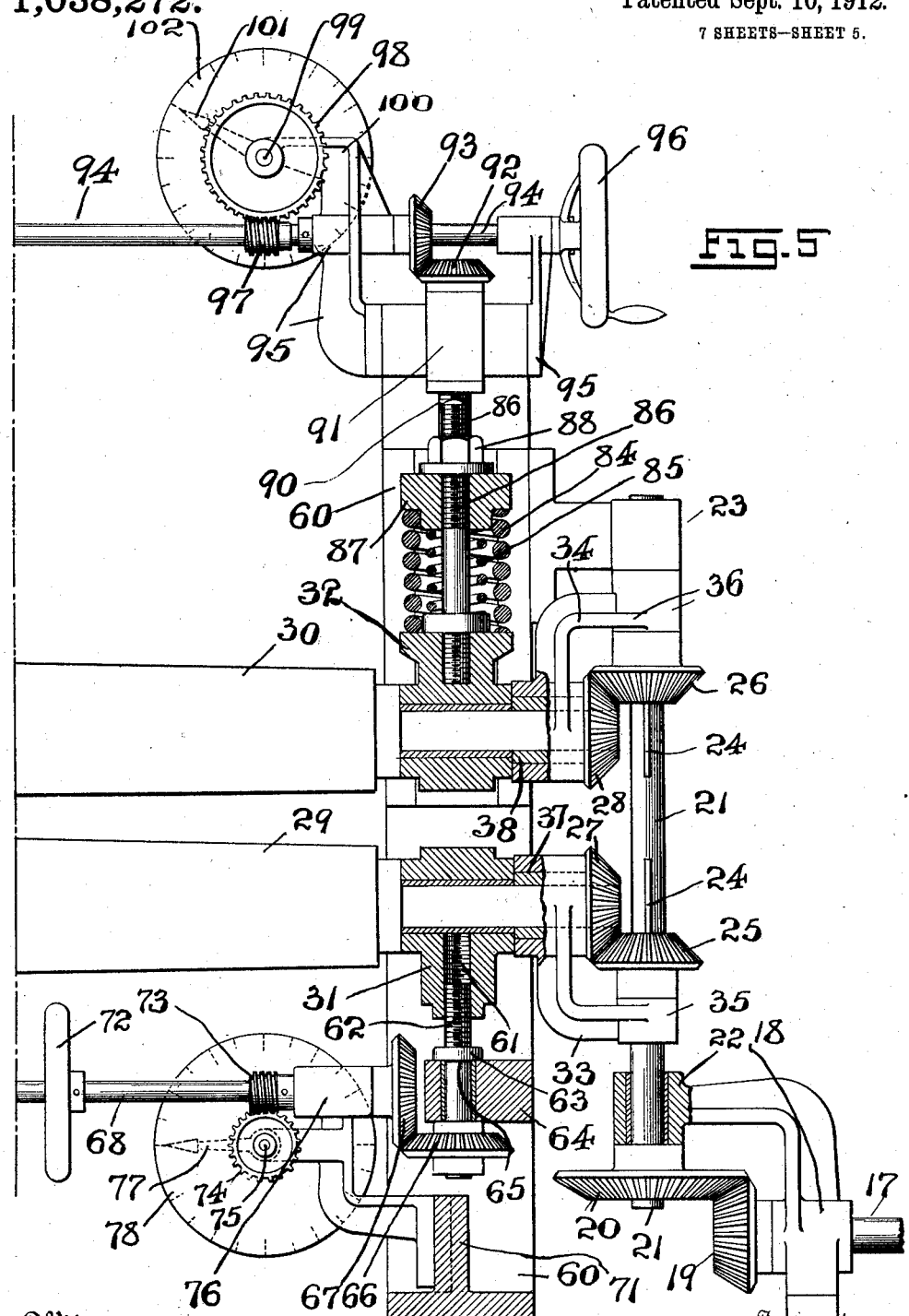

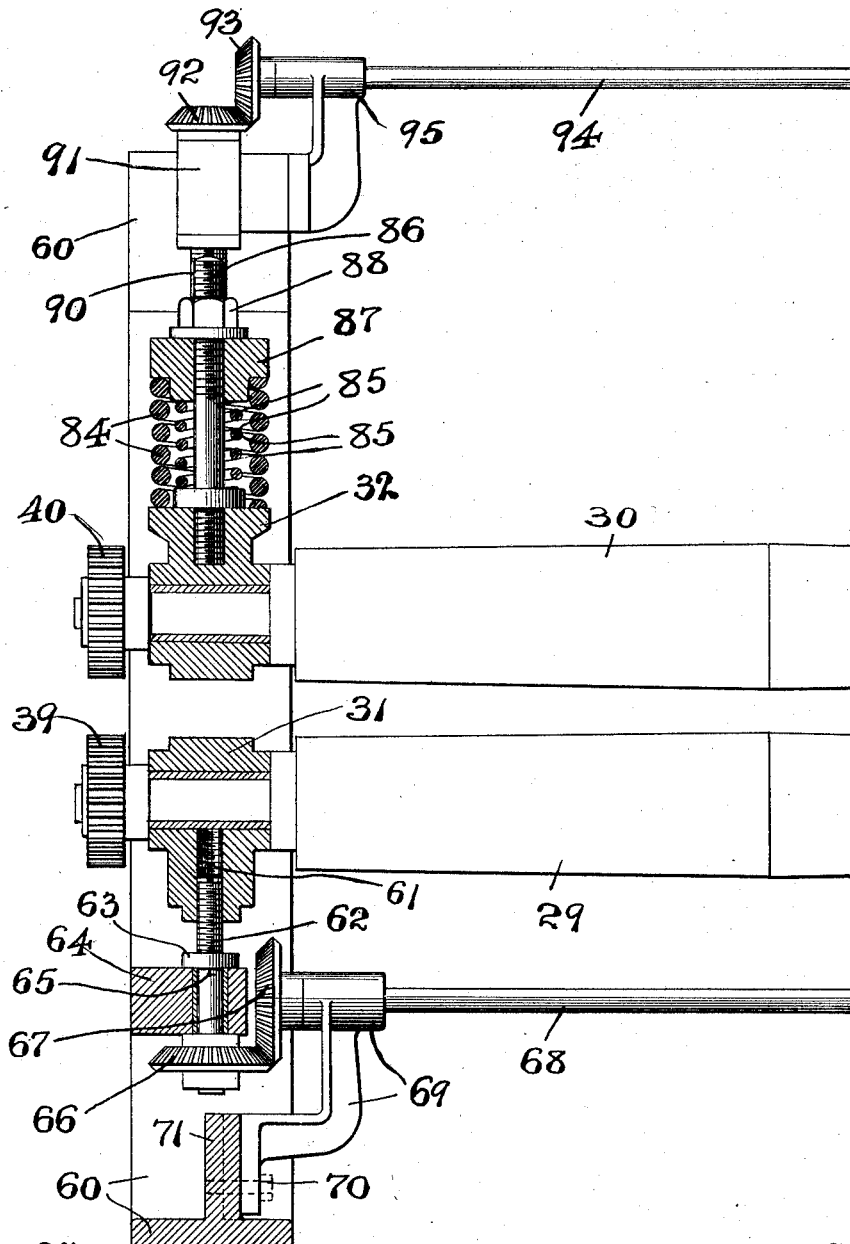

A. H. BIERTUEMPFEL.
MACHINE FOR SPLITTING CORK BARK.
APPLICATION FILED AUG. 4, 1911.
1,038,272.
Patented Sept. 10, 1912.
7 SHEETS—SHEET 7.
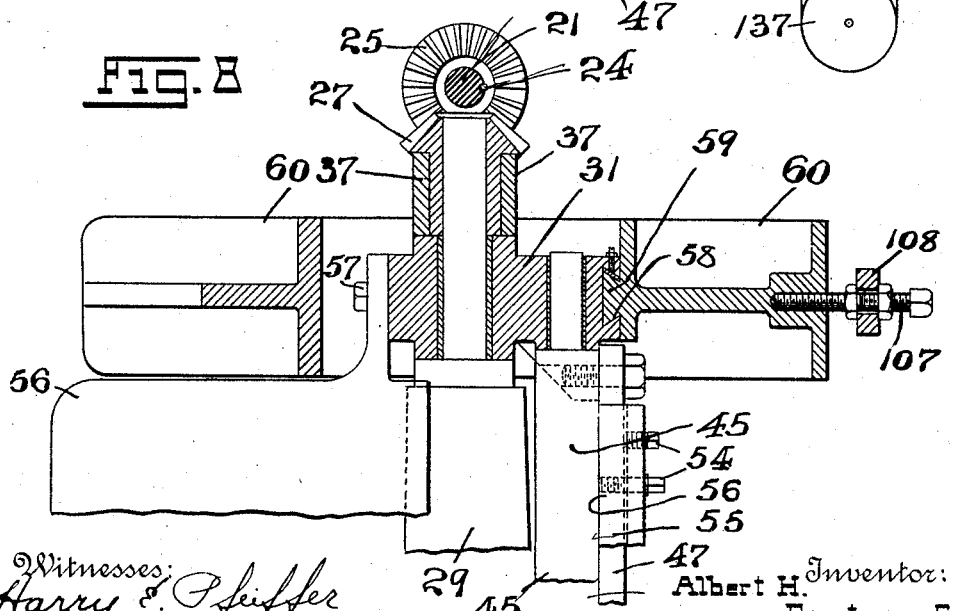

UNITED STATES PATENT OFFICE.

ALBERT H. BIERTUEMPFEL, OF NEWARK, NEW JERSEY.

MACHINE FOR SPLITTING CORK-BARK.

1,038,272.  Specification of Letters Patent.  Patented Sept. 10, 1912.

Application filed August 4, 1911. Serial No. 642,249.

*To all whom it may concern:*

Be it known that I, ALBERT H. BIERTUEMPFEL, a citizen of the United States, residing at Newark, in the county of Essex and State of New Jersey, have invented certain new and useful Improvements in Machines for Splitting Cork-Bark; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in machines for splitting cork-bark; and, the present invention has reference, more particularly, to a novel cork-splitting machine with which the method of cutting the cork-bark into narrow strips or pieces of uniform widths and sizes, adapted to be fed to a revolving disk-knife or cutter, as heretofore, is fully obviated.

The invention has for its primary object to provide a cork-splitting machine of the general character hereinafter set forth, and which shall be of the utmost simplicity, both as to its construction and operation; and, furthermore, to provide a cork-splitting machine which is more accurate, positive and efficient than the cork-splitting machines at present in general use.

The present invention has for its further object to provide a cork-splitting machine with which the method, heretofore in use, of first cutting the cork-bark into narrow strips of uniform widths and sizes is fully obviated, so as to overcome the usual waste of the material and the uneven splits which are also caused by the constructions of cork-splitting machine employing in connection therewith the usual forms of revolving disk-knives or cutters.

The invention has for its further object to provide a cork-splitting machine in which the skinning of the cork-bark, a so-called waste, is left in large sheets the actual size in which it comes or is cut from the back, so that there will be no waste and may be used for partitions and the lining of boxes, for the shipping of glassware, and the like, thereby avoiding the additional step and expense of grinding the waste cork-bark to a certain grain, which is thereupon placed upon paper which has been coated with a suitable glue and then compressed. However, the various processes which the ground cork-bark has to undergo cause the ground cork to lose much of its elasticity aside from the additional labor and cost which is consequently necessary. With the general construction of machine or apparatus embodying the principal features of the present invention, the cork-linings are produced in large sheets which are of the actual sizes immediately at the beginning of the splitting, whereby the cork-wood retains its original elasticity, the cork-bark being left in its original raw state, which, as will be understood, is a great advantage both in the saving of material and cost.

A further object of this invention is to provide a cork-splitting machine by means of which the surface of the cork-bark is sufficiently spread just before it reaches the cutting edge of the knife, so as to remove or take out the small cavities which usually appear in the cork-bark; and, also, to produce much finer splits, which is an important feature in producing splits of commercial value, such spreading of the surface of the cork-bark being accomplished by the use of a large feed roll which is slightly conical, tapering sufficiently from the middle toward each end of the roll, and by employing in connection therewith a smaller feed-roll which travels at a faster speed than the ordinary speed of travel which is necessary in splitting the cork-bark in its natural raw state.

Still another feature of this invention is to provide a cork-splitting machine in which the various devices and parts of the machine are capable of quick, easy, and accurate adjustments.

Various other objects of this invention not at this time more particularly enumerated will be clearly obvious from the following detailed description of the present invention.

With the various objects of the present invention in view, the said invention consists, primarily, in the novel cork-splitting machine hereinafter set forth; and, the invention consists, furthermore, in the novel arrangements and combinations of the various devices and parts, as well as in the details of the construction of the same, all of which will be more fully described in the following specification, and then finally embodied in the clauses of the claims which are appended to and which form an essential part of the said specification.

The invention is clearly illustrated in the accompanying drawings, in which:—

Figure 1 is a front elevation of a cork-splitting machine, illustrating one embodiment of the principles of the present invention and showing in connection therewith an arrangement of band-knife for cutting or splitting the cork-bark into sheets; Fig. 2 is a top or plan view of the same; and Fig. 3 is a view of the machine, partly in end elevation and partly in transverse vertical section, said section being taken on line 3—3 in said Fig. 1, looking in the direction of the arrows shown in connection with said section line, said view being made on an enlarged scale. Fig. 4 is a transverse vertical section of the machine, said section being taken on line 4—4 in said Fig. 1, looking in the direction of the arrow $y$, and said view being also made on an enlarged scale; Fig. 5 is a longitudinal vertical section, taken on line 5—5 in said Fig. 4, looking in the direction of the arrow $z$, and Fig. 6 is a similar section, showing the other end-portion of the machine, both said Figs. 5 and 6 being made on still larger scales. Fig. 7 is a detail horizontal section taken on line 7—7 in said Fig. 4, looking in the direction of the arrows $u$; and Fig. 8 is also a detail horizontal section, said section being taken on line 8—8 in said Fig. 4, looking in the direction of the arrows $v$. Fig. 9 is an enlarged detail cross-section of the band-knife; and Fig. 10 is a similar section of a band-knife of a slightly modified construction, showing the bevel or knife-edge ground down a trifle off center, for the purpose of producing very fine splits. Fig. 11 is a diagrammatic representation of another slight modification showing a vertical arrangement of the band-knife, in lieu of the horizontal arrangement of band-knife represented in the foregoing figures of the drawings.

Similar characters of reference are employed in all of the above described views, to indicate corresponding parts.

The cork-splitting machine herein shown is of any suitable construction, being adapted to split various thicknesses of cork-bark of any size and dimensions, and the machine comprises a main supporting frame, as 1, which is provided at its respective end-portions with the preferably fork-shaped elements or members 2 and 3 which are suitably connected with the said end-portions of the said frame, as will be clearly evident. Mounted in suitable bearings 4 connected with the said element or member 2 is a driveshaft or spindle 5 upon which is mounted and suitably secured a suitably flanged pulley or wheel 6. Similarly mounted in bearings 7 connected with the element or member 3, said bearings 7 being slidably mounted upon said element or member 3, is a shaft or spindle 8 upon which is suitably mounted another flanged pulley or wheel, as 9, which serves as an idler or guide-pulley, and passing over the said pulleys or wheels 6 and 9 is a continuous band-knife 10. The adjustment of the bearings 7, and consequently of the said shaft or spindle 8 and its pulley or wheel 9, is produced by means of screws 11 which turn freely in screw-threaded projections, as 12, connected with the element or member 3, whereby any slack in the band-knife is readily taken up, and the knife is brought under the proper tension. The shaft or spindle 5 may be driven from a belt 13 which passes over a pulley-wheel 14 upon said shaft or spindle, but it will be clearly understood that the said shaft or spindle 5 may be driven by other suitably constructed mechanism from any outside source of power. Suitably secured upon said driving shaft or spindle 5 is a bevel gear 15, and meshing with said gear 15 is a bevel gear 16 which is affixed to a horizontal shaft 17, said shaft being rotatably mounted in bearings 18 suitably secured upon said element or member.

Suitably secured upon the opposite end-portion of said shaft 17 is a bevel-gear 19 and coöperating with said gear 19 is a bevel gear 20 which is keyed to the lower end-portion of a vertical shaft 21, said shaft 21 being rotatably mounted in a bearing-bracket 22 and a bearing 23. The said shaft 21 is provided with suitable splines 24, and slidably mounted upon the said shaft and the said splines are a pair of bevel-gears 25 and 26, which respectively mesh or are in operative engagement with the correspondingly placed bevel-gears 27 and 28 of the lower and upper and, as has been previously stated, preferably conical feed-rolls 29 and 30, the journals of which are rotatably mounted in the respective slidable block-bearings 31 and 32, located at the opposite end-portions of said rolls. As shown, angular brackets 33 and 34 are freely supported upon the vertical shaft 21 by means of their respective bearing-portions 35 and 36, the journals of the respective feed-rolls 29 and 30 being rotatably mounted in correspondingly placed bearing-portions 37 and 38, so that a positive rotation is transmitted to the conical feed-rolls 29 and 30, as the thickness of the cork-bark decreases while the splitting operations are being performed, as will be clearly evident from an inspection of the several figures of the drawings, and as more clearly shown in Fig. 5 of the drawings. Referring now to Fig. 6 of the drawings, it will be seen that to the journals at the opposite ends of the respective conical rolls 29 and 30 are secured suitable spur-gears 39 and 40, which, as shown in Fig. 3 of the drawings, mesh with the respective intermediate gears 41 and 42, and which latter gears mesh, respectively, with pinions 43 and 44 which are suitably connected with a set of smaller feed-rolls 45 and 46. These feed-rolls 45 and 46 have their journals rotatably mounted in the said bearing-blocks 31 and 32. The principal object of this arrangement of auxiliary feed-rolls 45 and 46 is for the purpose of getting or arranging the cutting edge of the band-knife 10 very close to the roll, so as to allow for the necessary clearance-space between the rolls and the knife. Another advantage, and a very important one, is obtained, as by this arrangement of the rolls, the rolls can be made to travel a little faster than the travel of the material itself, thereby obtaining the required spreading of the cork-bark, so that the visible cavities in the cork-bark, while splits are being made, are removed. The conical feed-rolls 29 and 30, as has already been stated, also serve this purpose.

Suitably secured to and connected with the respective block-bearings 31 and 32 are stationary or fixed plates 47, each plate being provided with a tension or guide-roll, as 48, rotatably mounted in the bearings 49 connected with the said plates. Each bearing 49 is adjustably or slidably connected with the said plates 47 by means of dove-tail tongues 50 which extend into properly disposed slots or grooves 51 in said plates. Adjustment is made by means of adjusting screws 52 which are tapped into lugs 53 formed upon said plates 47, and by means of which the tension of the said smaller feed-rolls may be readily regulated. Suitably connected with the said stationary or fixed plates 47, by means of suitably disposed adjusting screws, as 54, are guide-plates or elements 55, of the general construction shown more particularly in Figs. 1, 3 and 4 of the drawings. Each guide-plate 55 is provided with a longitudinally extending chamfered edge, as 56, said marginal edges of the respective guide-plates being located in close proximity to the said tension or guide-rolls 48, substantially as shown. The main purpose of the said guide-plates 55 is to prevent any vibrations in said rolls 48 which may occur during the operation of the machine. The purpose of the said adjusting screws 54 is to provide for the accurate adjustments or settings of the guide-plates upon the said fixed plates 47. Extending laterally across the main frame-work of the machine is a suitable feed-table, as 56, as will be seen from Figs. 4 and 8, the said table being suitably and preferably secured to the previously mentioned slidable block-bearings 31 by means of screws or bolts, as 57, or other suitable fastening means. Upon its opposite side, each bearing-block 31 is provided with a dove-tail groove 58 into which extends a tongue or projection, as 59, with which each standard 60, mounted upon the main supporting frame 1, is provided, so that each bearing-block 31 is slidably connected with its standard 60.

As will be seen from an inspection of Fig. 6 of the drawings, each bearing-block 31 is formed with an internally screw-threaded part 61 in which is adjustably arranged a portion of the screw-threaded shank of an adjusting screw 62, said screw being provided with an annular flange or shoulder 63 which rests upon a bearing-like member or lug 64 with which the standard 60 is provided, and in which the smooth and lower end-portion 65 of the adjusting screw 62 is rotatably arranged. Suitably secured upon the free end-portion of each adjusting screw 62, extending beneath the lower surface of each member or lug 64, is a bevel-gear 66, and meshing with said gears 66 are other bevel-gears, as 67, which are suitably mounted upon a laterally extending shaft 68, rotatably supported in bearing-brackets 69 which are suitably secured by means of bolts, as 70, to portions 71 with which the said standards 60 are provided. The said shaft 68 is provided with a hand-wheel 72 for turning the same, said shaft having also suitably secured thereon a worm, as 73. This worm 73 is in engagement with a worm-wheel 74 which is suitably mounted upon a stub-shaft 75 rotatably arranged in a bearing-portion 76 which is suitably connected with and extends from one of the said bearing-brackets 69. Affixed to the said stub-shaft 75 is a pointer 77 which is adapted to register with an indicator-dial, as 78, which is secured to the said bearing-bracket 69 in any suitable manner. It will be clearly evident from an inspection of Fig. 5 of the drawings, that this mechanism is for the purpose of moving the bearing-blocks 31 in upward or downward directions as may be desired, as well as the conical feed-roll mounted between said bearing-blocks, and for the purpose of gaging the thickness of the cork-bark which it is desired to split.

The upper sliding bearing-blocks 32 in almost all respects are similar in construction to the bearing-blocks 31, except that each bearing-block 32 is provided with a tongue 79 slidably arranged in a groove 80 formed in an independent vertical slide 81. Each slide 81 has a similar tongue 82 which extends into and is slidably disposed in a groove or guiding portion 83 in each standard 60.

That the amount of pressure required to compress the cork-bark may be properly regulated, as it is being split, suitable compression springs 84 and 85 are provided, said springs encircling suitable adjusting screws 86, the lower end-portion of each screw being suitably secured to the upper surface of a bearing-block 32, and the screw-threaded portion of each screw 86 extending into and through a tubular portion of a lug or projection, as 87, with which each slide 81 is provided. Proper adjustment is made by means of adjusting nuts 88 movably arranged upon the screw-threaded portion of each screw 86, each nut 88 being adapted to bear upon the upper surface of the respective lug or projection 87, as will be clearly evident from an inspection of Fig. 4 of the drawings.

Each lug or projection 87 of each vertical slide 81 is also internally screw-threaded, as at 89, to receive the lower portion of a screw 90, each screw 90 being suitably supported by means of a bracket-like member or element 91 rigidly connected with each standard 60. Suitably mounted upon the upper portion of each screw 90 is a bevel-gear 92, each gear 92 meshing with a bevel-gear 93. Said gears 93 are suitably connected by means of a laterally extending shaft 94 which is rotatably mounted in bearing-brackets 95 which are connected with said standards 60, said shaft 94 being provided with a suitable hand-wheel 96 for operating the same. This shaft is likewise provided with a worm 97 which is in engagement with a worm-wheel 98 secured upon a stub-shaft 99 rotatably mounted in a bearing-bracket 100. Suitably secured to the opposite end of said stub-shaft 99 is a pointer 101 which registers with an indicator-dial 102, suitably secured in any well-known manner to the said bearing-bracket 100. This mechanism is for the purpose of moving the bearing-blocks 32, and the conical feed roll mounted between said bearing-blocks, in downward or upward directions, as may be desired, so as to gage the proper thickness of the cork-bark which is to be split.

Suitably connected with and arranged between the lower slidable bearing blocks 31 and the upper slidable bearing-blocks 32 are suitably constructed guide-strips, as 103, having for their purposes to more permanently guide the cork-bark during the splitting operation.

It has been found in general practice, that it is desirable to provide a suitable knife-guide, substantially of the construction shown in Figs. 3 and 4 of the drawings. This knife-guide comprises a suitably formed and angular supporting plate or element 104 which extends laterally across the rear of the machine and is suitably secured to said standards 60, the said plate being provided with elongated slots 105 and being secured by means of bolts 106, said slots and bolts permitting of a proper adjustment of the said supporting plate 104, by means of suitably disposed adjusting screws 107 which pass through perforated end-portions formed in suitably downwardly extending members 108 upon said plate 104. After proper adjustment, the plate 104 is fixed in its adjusted position by tightening the bolts 106. Adjustably arranged upon the said supporting plate or element 104 are a pair of outer plates 109 and 110, between which is arranged a sheet-metal plate, as 111, the said plates 109, 110 and 111 being yieldingly secured together by means of suitable screws, as 110¹.

The longitudinal marginal edge-portions 112 and 113 of the said plates 109 and 110 are chamfered, substantially as represented in Fig. 4 of the drawings, the plate 111 being of sufficient thickness to separate said plates 109 and 110 the required distance, to permit of the proper guidance of the band-knife during its passage between said edge-portions 112 and 113, as will be clearly evident. Proper adjustment of the said plate 111 between said plates 109 and 110 and against the edge of band-knife is made by means of adjusting screws 114 which move back and forth in screw-threaded holes 115 in a flange 116 with which the said supporting element or plate 104 is provided.

A suitably constructed cleaning or wiping device, as 117, may be used in connection with the band-knife, as illustrated in Fig. 2 of the drawings, the said device being composed of felt saturated with oil, and being attached preferably to one of the fork-shaped elements or members, as 2.

As shown more particularly in Fig. 3 of the drawings, the return or lower portion of the band-knife may be made to move between a pair of grinders or emery-wheels 118 rotatably mounted in a frame 119 which is slidably arranged in a stationary frame 120, and said frame 119 being adjusted by means of an adjusting screw 121 which is provided with a hand-wheel 122 for operating said screw. The said grinders or emery-wheels 118 are mounted upon shafts or spindles 123 which revolve in vertical sliding bearing-blocks 124, such vertical adjustment being accomplished by means of suitably arranged adjusting screws 125. A tension or take-up pulley 126 is mounted in a sliding block 127, said block being slidably mounted upon the frame 119, and being adjusted by means of a suitably disposed adjusting screw 128.

The reference-character 129 indicates a driving pulley which is suitably mounted upon a driving shaft 130, mounted in bearings in the frame 120. Upon said shaft 130 is a pulley-wheel 131 over which and suitable pulleys 132 upon the shafts or spindles 123 passes a belt, as 133, said belt passing also over an idler 134, and over the said tension or take-up pulley 126, substantially in the manner illustrated in said Fig. 3 of the drawings. The said grinding mechanism just described may be incased in a suitable casing or cover, as 135.

Referring to Fig. 11 of the drawings, there is shown therein diagrammatically an arrangement of two vertically disposed wheels or rollers 136 and 137, over which moves a band-knife 138. This arrangement may be used in lieu of the horizontal arrangement of the band-knife, it being understood, however, that the arrangement of the feed-rolls for feeding the cork-bark to the band-knife, and the adjusting devices employed in connection with the said feed-rolls, may be varied accordingly.

I am aware that certain changes may be made in the general arrangements and combinations of the various devices and parts, as well as in the details of the construction of the said parts, without departing from the scope of the present invention as set forth in the foregoing specification and as defined in the clauses of the claim which is appended thereto. Hence, I do not limit my present invention to the exact arrangements and combinations of the said several devices and parts as described in the said specification, nor do I confine myself to the exact details of the construction of the said parts as illustrated in the accompanying drawings.

I claim:—

1. In a machine for splitting cork-bark into sheets, a frame-work, a band-knife, means for producing a continuous movement of said knife, feed-rolls rotatably mounted in said frame-work, said feed-rolls being of such construction so that the cork-bark is passed under compression between said feed-rolls and that the surface of the cork-bark is spread before it reaches the cutting edge of said band-knife, and means for producing the rotary movements of said feed-rolls.

2. In a machine for splitting cork-bark into sheets, a frame-work, a band-knife, means for producing a continuous movement of said knife, feed-rolls rotatably mounted in said frame-work, said feed-rolls being conically shaped and tapering in opposite directions from the middle toward the ends of the rolls, so that the cork-bark is passed under compression between said feed-rolls and that the surface of the cork-bark is spread before it reaches the cutting edge of said band-knife, and means for producing the rotary movements of said feed-rolls.

3. In a machine for splitting cork-bark into sheets, a frame-work comprising a pair of standards, bearing-blocks slidably connected with said standards, a band-knife, means for producing a continuous movement of said knife, feed-rolls journaled between said bearing-blocks, said feed-rolls being of such construction so that the cork-bark is passed under compression between said feed-rolls and that the surface of the cork-bark is spread before it reaches the cutting edge of said band-knife, auxiliary feed-rolls, and tension rolls also rotatably mounted between said bearing-blocks, and means for producing the rotary movements of said feed rolls and said tension rolls and causing said rolls to travel faster than the material which is to be split, whereby the material is sufficiently spread to remove visible cavities.

4. In a machine for splitting cork-bark into sheets, a frame-work comprising a pair of standards, bearing-blocks slidably connected with said standards, a band-knife, means for producing a continuous movement of said knife, feed-rolls journaled between said bearing-blocks, said feed-rolls being of such construction so that the cork-bark is passed under compression between said feed-rolls and that the surface of the cork-bark is spread before it reaches the cutting edge of said band-knife, auxiliary feed-rolls, and tension rolls also rotatably mounted between said bearing-blocks, and means for producing the rotary movements of said feed rolls and said tension rolls and causing said rolls to travel faster than the material which is to be split, whereby the material is sufficiently spread to remove visible cavities, combined with stationary plates fixed to said bearing-blocks, and guide-plates adjustably connected with said stationary plates, each guide-plate having chamfered edge-portion located in close proximity to the surface of an auxiliary feed-roll.

In testimony that I claim the invention set forth above I have hereunto set my hand this 2nd day of August, 1911.

ALBERT H. BIERTUEMPFEL.

Witnesses:
 FREDK. C. FRAENTZEL,
 FREDK. H. W. FRAENTZEL.

Copies of this patent may be obtained for five cents each, by addressing the "Commissioner of Patents, Washington, D. C."